United States Patent [19]
Mårtensson

[11] Patent Number: 5,470,019
[45] Date of Patent: Nov. 28, 1995

[54] DEVICE FOR CONTROLLING HEATING BOILERS

[75] Inventor: Göran Mårtensson, Sandviken, Sweden

[73] Assignee: Riverlake Investments Ltd., Tortola, Virgin Islands (Br.)

[21] Appl. No.: 204,375

[22] PCT Filed: Jul. 14, 1993

[86] PCT No.: PCT/SE93/00627

§ 371 Date: Mar. 11, 1994

§ 102(e) Date: Mar. 11, 1994

[87] PCT Pub. No.: WO94/02787

PCT Pub. Date: Feb. 3, 1994

[30] Foreign Application Priority Data

Jul. 16, 1992 [SE] Sweden ................................ 9202181

[51] Int. Cl.[6] .................................................... F24D 3/08
[52] U.S. Cl. ........................... 237/19; 122/446; 236/46 R; 237/8 R
[58] Field of Search ................... 122/446; 62/158; 237/8 R, 19; 236/46 R, 20 R

[56] References Cited

U.S. PATENT DOCUMENTS

| 2,266,245 | 12/1940 | Osterheld | 219/39 |
| 2,266,253 | 1/1941 | Osterheld | 219/39 |
| 4,381,075 | 4/1983 | Cargill et al. | 237/19 |
| 4,470,541 | 9/1984 | Raleigh | 237/8 R |
| 4,850,310 | 7/1989 | Wildgen | 122/446 |

*Primary Examiner*—William E. Wayner
*Attorney, Agent, or Firm*—Thomas J. Engellenner; Edward J. Kelly; Lahive & Cockfield

[57] ABSTRACT

A device for heating boilers (1) in heating plants comprises a means (2) for heating a heat carrying medium present in the boiler and circulating out thereof in the heating plant as well as a means (11) adapted to detect the temperature of the heat carrying medium present in the boiler and send signals to the heating means (2) to start and stop the heating of the medium when a first lower temperature level is underpassed and a second higher temperature level is exceeded, respectively, by the medium in the heating boiler (1). The device comprises further means (12) adapted to delay the start of the heating means (2) when the first temperature level is reached by the medium and this is detected by the detecting means (11).

21 Claims, 2 Drawing Sheets

DEVICE FOR CONTROLLING HEATING BOILERS

FIELD OF THE INVENTION AND PRIOR ART

The present invention relates to a device for heating boilers in heating plants having a means for heating a heat carrying medium present in the boiler and circulating out thereof in the heating plant as well as a means adapted to detect the temperature of the heat carrying medium present in the boiler and send signals to the heating means to start and stop the heating of the medium when a first lower temperature level is underpassed and a second higher temperature level is exceeded, respectively, by the medium in the heating boiler.

The invention is in particular directed to devices for oil and gas boilers, and it will as a consequence thereof be discussed below for this application for exemplifying but non-limitative purpose. A disadvantage in common to all heating boilers for heating the rooms of a building and provide tap hot-water consists in that they are dimensioned so that they are able to manage conditions, in which an extremely high heating demand exists, i.e. during the coldest winter days. This means that the capacity of the heating boilers is utilised to the greatest extent during cold periods, but the heating boilers get over-dimensioned with respect to the rest of the year, when the heating demand generally is only a fraction of the amount of heat which may be supplied by the boilers, so that the efficiency sometimes will be comparatively low.

It would therefor be desired to improve the efficiency of a heating boiler, so that it may comply with the heating demand when this is extremely high but nevertheless requires a considerably lower amount of supplied energy, in the oil boiler case fuel in the form of oil, for obtaining the heating comfort aimed at during periods of both high and low heat demands, and especially in the latter case, in which the heating boiler must be considered to be strongly over-dimensioned.

SUMMARY OF THE INVENTION

Accordingly, the object of the present invention is to provide a device according to the type mentioned in the introduction, which finds a remedy to the inconveniences mentioned above by making it possible to increase the efficiency of a heating boiler, especially when the heat demand is low, i.e. during warm seasons.

This object is obtained by the invention by providing a device of the type mentioned in the introduction with means adapted to delay the start of the heating means when the first temperature level is reached by the medium and this is detected by the detecting means.

Thus, by the invention it has been realized that it is possible to increase the efficiency of a heating boiler by modifying the heating cycles thereof. The detecting means of the device according to the invention has the task to keep the temperature of the heat carrying means present in the heating boiler, i.e. usually the water, between said first and second levels and by that almost static, for what reason the detecting means for the sake of simplicity will be called thermal relay in the following. By the fact that the device according to the invention delays the start of the heating means commanded by the thermal relay the temperature of the heat carrying medium present in the heating boiler will fall slightly, but this will not detrimentally influence the heating capacity of the heating plant, since the medium circulating in the heating system of the building in question has a considerably lower temperature than the medium present in the boiler, and the shunt valve co-ordinated with the boiler is able to compensate this small lowering of the temperature of the heat carrying medium of the heating boiler. It has been found that a prolongation of the off time of the heating boiler by a certain ratio with respect to the normal off time commanded by the thermal relay does not require a prolongation of the heating time of the heating means of a ratio being just as high should said means in the heating in both cases deliver the same power. Expressed in another way this means that the device according to the invention leads to a requirement of a smaller amount of heat energy, i.e. fuel for obtaining the same heating result as before, which means that the efficiency of the heating plant increases.

In a heating means in the form of an oil burner an additional fuel saving is also obtained by the lower number of starts of the burner per time unit, since a small amount of oil disappears at each start without giving any real heat energy, and these small amounts of oil constitute a considerable part of the total fuel consumption when the heating demand is low.

By the combustion cycles of the heating boiler prolonged by the device according to the invention the boiler temperature is slightly lowered, whereby reduced energy losses are obtained, but this does not lead to any higher risk of corrosion or hot well.

According to a particularly preferred embodiment of the invention the delay means comprises a first member adapted to measure the time between exceeding of the second temperature level and underpassing of the first temperature level following thereupon detected by the detecting means, and the delay means is adapted to determine the length of the delay time on the basis of this time information and after this time has elapsed send signals starting the heating means. Thanks to the completely new method within this technique to measure the off time of the heating boiler, i.e. the time between switching off and on of the heating means commanded by the thermal relay, and utilise the result of this time measurement to determine the length of the delay time for the start of the heating boiler, an automatic adaption of the delay time to the heating demand prevailing for the moment is obtained, i.e. the delay time becomes automatically longer in warmer seasons and shorter in colder seasons or when the heating demand suddenly increases in the form of tapping great amounts of hot-water for bath, shower and the like. Thus, an optimum prolongation of the heating cycles of the heating boiler is always obtained in every moment, so that the heating time thereof, i.e. the burning time of the oil burner, per time unit, for instance per day, gets so low that the conditions on the whole admit. This involves in its turn maximum improvement of the efficiency of the heating boiler— independently of how the heating demand varies— while utilising the principle to prolong the heating cycles.

According to another preferred embodiment of the invention the delay means is adapted to determine the length of the delay time to be a pre-determined ratio of the time measured by the time means. The length of the delay time is by that chosen to be for example 80% of the time measured by the time means, i.e. the time it takes for the temperature of the heat carrying medium present in the heating boiler to sink from the second to the first temperature level. Thus, the length of the delay time may be several times lower during warmer than during colder seasons.

According to a further preferred embodiment of the invention the delay means comprises a microprocessor which may be programmed and is adapted to control the heating means, so that it becomes possible to change the data being the basis of the length of the delay time according to desire and adapt the device to certain parameters of a certain heating boiler, the heating plant in question and special wishes of the user.

BRIEF DESCRIPTION OF THE DRAWINGS

With reference to the appended drawings, below follows a specific description of a preferred embodiment of the invention cited as an example, In the drawings.

DETAILED DESCRIPTION OF A PREFERRED EMBODIMENT OF THE INVENTION

Figure 1:
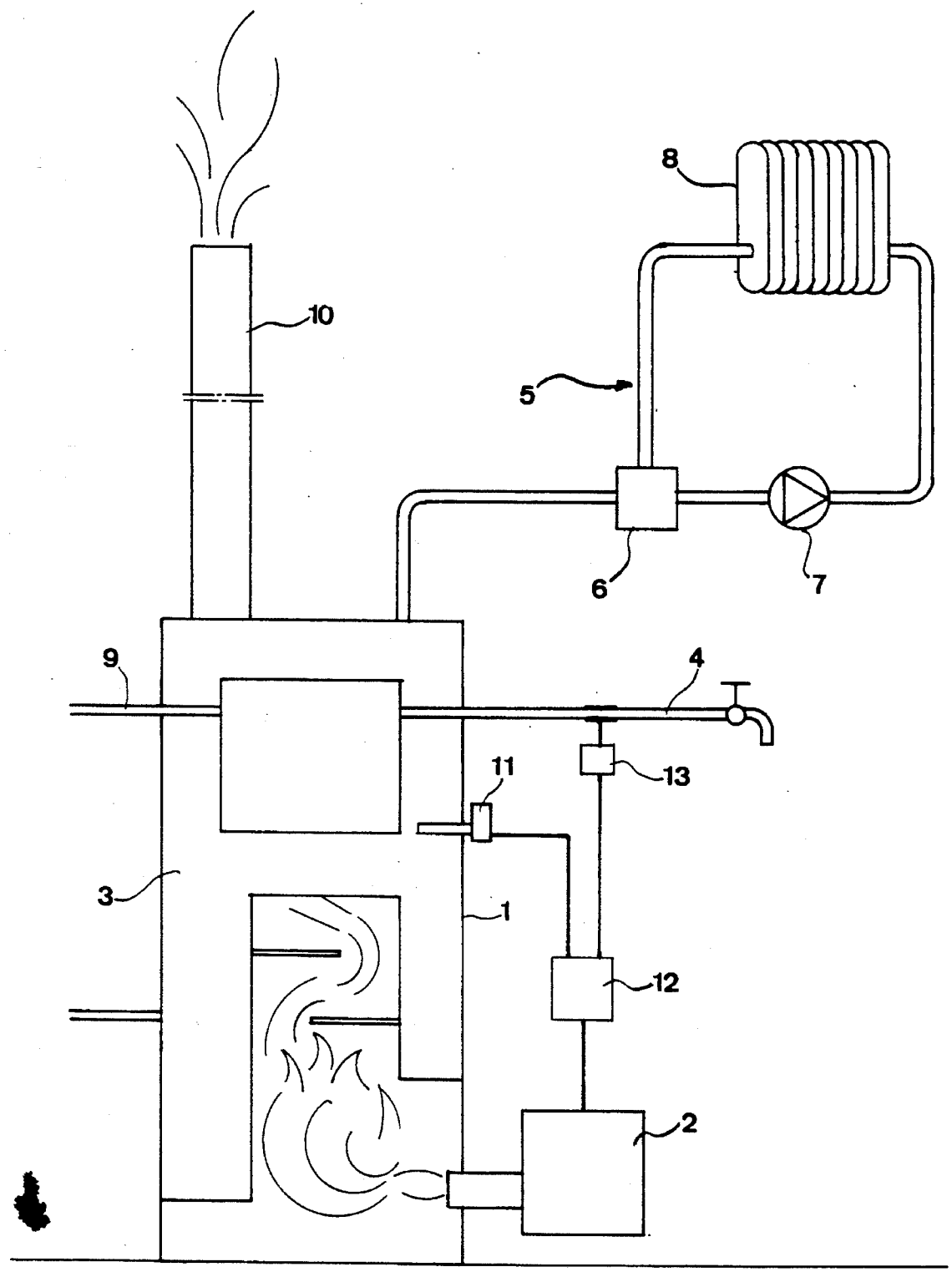
FIG. 1 is a schematic view of a heating plant and illustrates a device according to a preferred embodiment of the invention.

FIG. 1 illustrates schematically a device according to the invention applied on an oil boiler 1 having a burner 2 and a water tank 3 with water heated by the burner 2. The heating plant comprises further a tap hot-water system 4 schematically indicated by a tap and a room heating system 5 with a conventional shunt valve 6, circulation pump 7 and radiators 8. The heating plant comprises further an incoming conduit 9 for supply of cold water as well as a chimney 10 for discharging fluid gases resulting from the combustion of oil.

Furthermore, a thermal relay 11 is arranged to detect and react upon the temperature of the water present in the water tank 3 and heated by the burner 2. When the temperature of this water in the immediate proximity of the thermal relay when the burner is switched off falls below a first temperature level, for instance 75° C., the thermal relay sends a signal in the direction of the burner so as to start this. However, the means 12 of the device according to the invention for delaying the start of the burner 2 is connected in series to the thermal relay 11 between the latter and the burner 2. The delay means 12 comprises a microprocessor having a first member adapted to measure the time elapsing between an exceeding of a second temperature level, recognised by the thermal relay, at which level the thermal relay sends signal in the direction of the burner so as to turn it off, and the falling below said first temperature level following thereupon. The microprocessor is adapted to multiply the time delivered by said first time measuring member by a given factor, preferably between 0,6 and 1,0, particularly preferred about 0,8. On receiving a signal from the thermal relay 11 indicating that the first temperature level has been underpassed by the water in the water tank the microprocessor starts a count-down of the time resulting from the multiplication by said factor in a second time measuring member being a part thereof and the microprocessor is adapted to send the signal activating the burner 2 on to the burner 2 for starting it when said time is counted down.

Thus, an extension of the off-time of the heating boiler is obtained in this way, and the length of this extension is determined by a time measurement, more exactly by measuring the time elapsing between an exceeding of the second temperature level detected by the thermal relay and the underpassing of said first temperature level following thereupon. This means that the extension of the off time of the heating boiler will at a low energy consumption of the heating plant be longer than at a high heat demand of the heating plant.

The device comprises further a sensor 13 adapted to detect the temperature of the tap hot-water of the heating plant and when the latter falls below a pre-determined temperature level, for instance 45° C., being lower than the first temperature level send signals to the delay means 12 for stopping the delay and immediately starting the burner 2. The heating boiler may thereby deliver a sufficient amount of heat also if the time measured by the thermal relay would be long and the delay means by that determines a long delay time, but shortly after this determination a strongly increased tapping of tap hot-water, is commenced, for instance for a shower, bath or the like.

Figure 2:
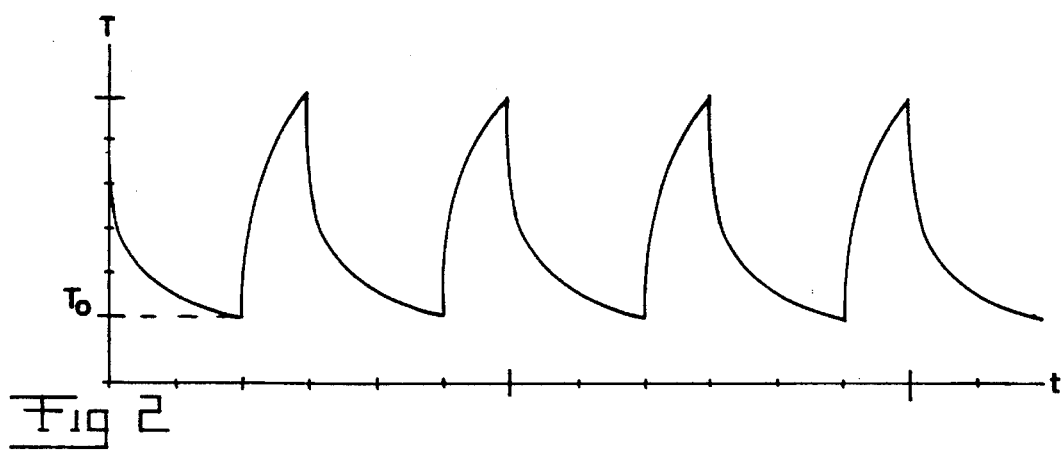
FIG. 2–5 are diagrams in which the temperature of the heat carrying medium present in the heating boiler measured by the thermal relay of the device according to FIG. 1 is plotted versus time for illustrating the function of the device according to the invention in some certain situations.
Figure 3:
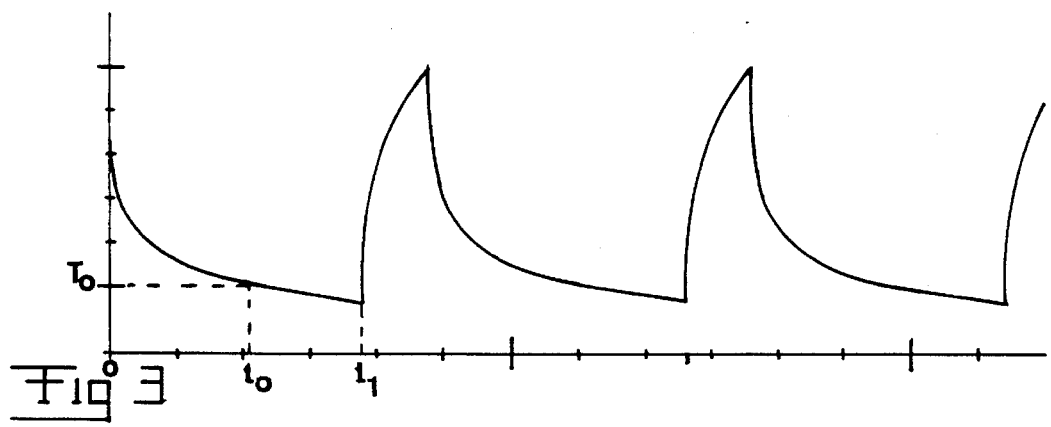

With reference to FIG. 2–5, the result obtained by the function of the device according to the invention will now be explained and compared with a device without the delay discussed above. It is shown in FIG. 2 how the temperature T measured by a thermal relay 11 may vary over the time t when said delay is not there. This is for the rest possible to achieve in the device according to the invention by programme the multiplying factor being zero in the microprocessor of the delay means 12. This means a certain numbers of starts of the burner 2 per time unit and at each start a certain operating time of the burner before, it is turned off again. The burner is started at the themperature $T_0$ of the hot-water of the boiler detected by the thermal relay 11 in the immediate proximity of the thermal relay. $T_0$ is in this case 75° C. and the second temperature level 80° C., but also another setting of the thermal relay, for instance 70° and 75° C., respectively, would be conceivable. The temperature T of the water in the water tank 3 measured by the thermal relay 11 is shown in FIG. 3 plotted versus time under exactly the same heat demand conditions as in FIG. 2, but the delay means is here adapted to prolong the off time by 80% of the time, which elapses from the detection of the second temperature level by the thermal relay and to the detection of the first one, so that the off time $t_1$ will be 1,8× $t_0$. This means in this case that the temperature of the water in the water tank has time to fall a little bit more before the burner is restarted, so that the operating time of the burner necessary for the heating to the second temperature level gets longer, but this longer operating time is not directly proportional to the prolongation of the off time of the boiler, but it ha:s turned out that it is considerably shorter. Experiments have shown that for instance at 8 starts within four hours having each an operating time of 10 minutes in the function according to FIG. 2, will correspond to five starts having an operating time of about 12,4 minutes each in the function according to FIG. 3. Since the total burning time of the oil burner, which has a constant burning power is directly proportional to the fuel consumption, a reduction of the fuel consumption by (80−62)/80=22% is accordingly contained. A further salving of oil is added thereto since at each starting moment a certain amount oil gets lost without any appreciable delivery of heat energy. It appears from FIG. 3 that the temperature of the hot-water at the thermal relay in practice falls very slowly during said off time extension, and this is due to that the thermal relay is located on the heating boiler at a considerable distance from the burner, usually in the upper part of the boiler, and it will therefor after the switching off of the burner as a consequence of the hot-water tapping from this part of the boiler detect a temperature fall being more rapid than actually is the case for the average temperature of the water present in the heating boiler, so that the thermal relay is "cheated" and sends signals activating the burner at the temperature level $T_0$, although this is not at all reached by said average temperature. However the heat is after by degrees transferred from the water tank regions near the bottom to those located in the region of the thermal relay, so that the temperature fall in the proximity thereof is strongly slowed down. For this reason it is possible to extend the off time as much as mentioned above without that the temperature of the water in the water tank of the heating boiler falls appreciable below the temperature $T_0$ set by the thermal relay.

Figure 4:
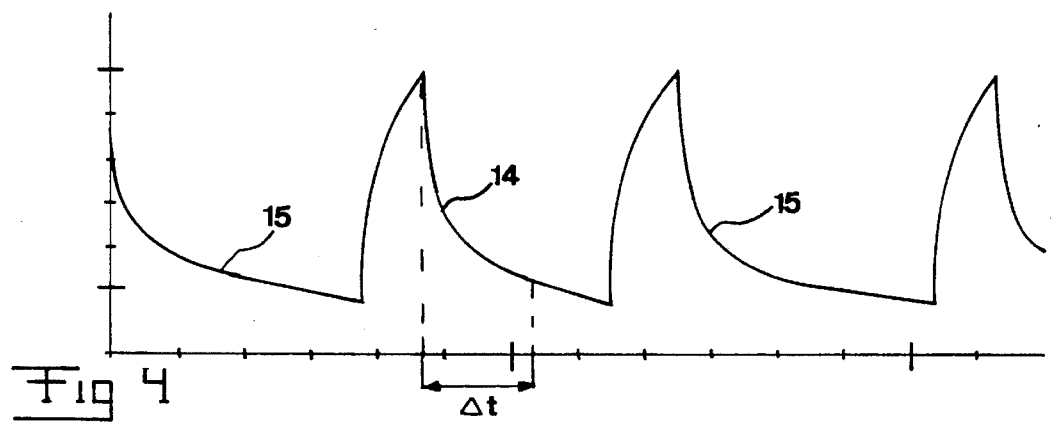

It is illustrated in FIG. 4 what happens when the heat demand of the heating plant gets higher. A second off period 14 shown in this diagram is thought to be there during the time in which the heat demand of the device is comparatively high, while the off periods 15 shown before and after this are there when the heat demand of the heating plant is low. The periods shown in FIG. 4 are in the reality not successive, although this would be possible. It appears from FIG. 4 how the delay means of the device according to the invention thanks to the measuring of the time $\Delta t$ between the second and the first temperature level procure a delay of the start of the burner 2, which is adapted to the heat demand prevailing at that moment, i.e. a long delay at a long off time between the two levels, i.e. a long $\Delta t$, and a short delay at a shorter off time between said levels.

Figure 5:
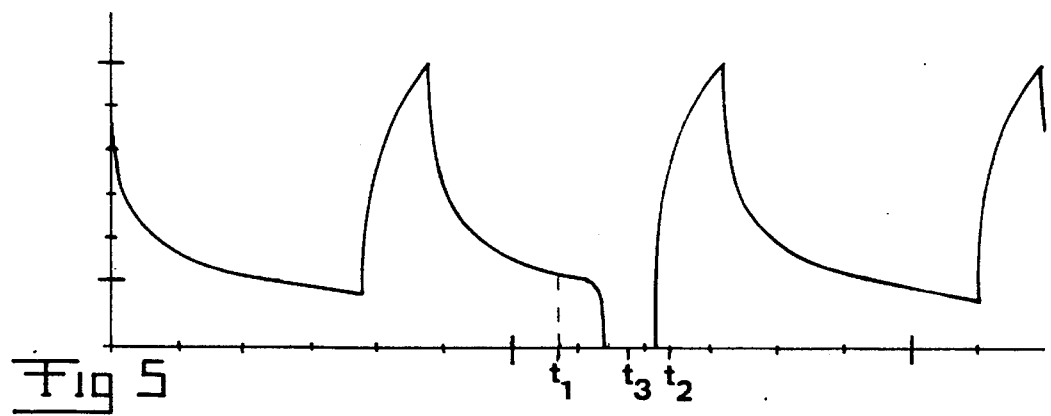

It is illustrated in FIG. 5 how the device manages the situation when after a long off time between said levels and by that a long delay time commanded suddenly shortly after the start of this delay time the hot-water tapping of the heating plant increases dramatically. Said first temperature level of the water in the heating boiler has been reached at the time $t_1$ as a consequence of which the microprocessor starts a count-down of the delay time, which is intended to be terminated at $t_2$. However, as a consequence of the comparatively long time between $t_1$ and $t_2$ and the great tapping of hot water the sensor 13 will already at the time $t_3$ detect that the temperature of the tap hot-water has fallen to 45° C. whereupon it sends signals to the delay means to stop the delay and immediately start the burner. It would otherwise without the arrangement of the sensor 13 be possible that the heating boiler would be totally drained of hot-water before the start of the next combustion cycle with the inconveniences connected thereto.

The microprocessor is preferably designed to store data concerning burning times of the burner, off times between said second and first temperature level and delay times in a memory, so that it is possible for the sake of comparison to run tests for the heating plant with the delay function of the device turned on and turned off, respectively. It may also be of interest to study information about off and burning times stored by the microprocessor so as to determine the optimum extension of the off time as a ratio of off times between said first and second temperature level so as to programme this ratio in the microprocessor. It is also conceivable that there is a wish to change this ratio with the seasons, it would especially be suitable to increase this ratio a little bit in the case that the thermal relay is set at somewhat lower temperature levels in warmer seasons.

The invention is of course not in any way restricted to the preferred embodiment described above, but several possibilities to modifications thereof would be apparent to a man skilled in the art without departing from the basic idea of the invention.

The patent claim definition "means adapted to detect the temperature of the heat carrying medium present in the boiler" is to be interpreted in its broadest sense, which means that it is also intended to comprise the case in which the heating boiler is connected to a reservoir for accumulating hot-water and the thermal relay is arranged in connection to this reservoir.

It would also be possible to programme the microprocessor so that this does not make the delay of the off time directly proportional to the off time between said second and first temperature levels, but introduces this off time in any special mathematical formula for calculating and determining the delay of the off time, although it has turned out to function very well with a direct proportionality.

Furthermore, the first and second time measuring means could be constituted by one and the same clock. The time measuring means have for the rest not necessary to indicate time, as a conventional chronometer, but they may be any means being influenced by the time and are able to obtain the delay of the off time aimed at in dependence of the time between the detection of the exceeding and the underpassing of said temperature levels by the thermal relay.

I claim:

1. A device for controlling a boiler in a heating plant wherein the boiler has means for heating a heat carrying medium present in the boiler and circulating out thereof in the heating plant as well as means adapted to detect the temperature of the heat carrying medium present in the boiler and send signals to the heating means to start and stop the heating of the medium when a first lower temperature level is reached and a second higher temperature level is reached, respectively by the medium in the boiler, said device comprising delay means having a first time measuring member arranged to measure a time signal representing the time between the temperature of the heat carrying medium reaching the second higher temperature level and the temperature of the heat carrying medium reaching the first lower temperature level following thereupon, and processor means for determining a delay time signal as a function of the time signal and to generate as a function of the delay time signal, a start signal for starting said heating means at a time delayed from when the first temperature, level is reached by the medium.

2. A device for controlling a boiler, wherein the boiler has heating means for heating a heat carrying medium and detection means for detecting the temperature of the heat carrying medium and for generating a start signal to start said heating means in response to the heat carrying medium dropping below a predetermined temperature level, said device comprising delay means for delaying the start of said heating means and having means for measuring a time difference representing the time required for the heat carrying medium to change from a second temperature level to a first temperature level, and processor means, coupled to said detection means, and adapted for determining a time for delaying the start of said heating means as a function of said signal representative of said measured time difference and said first and second temperature levels of said heat carrying medium.

3. A device according to claim 1, wherein the delay means is adapted to connect in series between the detecting means and the heating means and is adapted to receive from the detecting means the signal indicating when said first lower temperature level of the medium is reached and to transmit to the heating means said start signal for delaying the start of the heating means.

4. A device according to claim 1, wherein the time measuring member is adapted to start measuring time in response to the temperature level of the medium reaching the second temperature level and to terminate measuring time in response to the temperature level of the medium reaching the first temperature level.

5. A device according to claim 1, wherein the delay means is adapted to determine the delay time signal as a predetermined ratio of the time signal measured by the first time measuring member.

6. A device according to claim 5, wherein the delay means is adapted to delay the start of the heating means by a delay time signal being 70–90% of the time signal measured by the first time measuring member.

7. A device according to claim 1, wherein the delay means comprises a second time measuring member coupled to the temperature detecting means and adapted to start measuring time in response to the temperature of the medium underpassing said first temperature level.

8. A device according to claim 7, wherein the delay means comprises a means adapted to multiply the time measured by the first time measuring member by a predetermined factor, and that the second time measuring member is adapted to count down the time obtained by this multiplication.

9. A device according to claim 7, wherein the delay means comprises a comparison means adapted to compare the time measured by the second time measuring member with said time signal from the first time measuring member and to generate the start signal for starting the heating means in response to the second time measuring member measuring a time substantially equivalent to a predetermined portion of the time signal from the first time measuring member.

10. A device according to claim 1, wherein the delay means comprises a microprocessor which may be programmed and is adapted to control the heating means.

11. A device according to claim 10, wherein the microprocessor comprises input means for receiving input signals that represent a ratio for determining the delay time signal.

12. A device according to claim 1, wherein the device comprises a means adapted to detect the temperature of tap hot-water of the heating plant and is further adapted to start the heating means responsive to the temperature of the tap hot-water reaching a pre-determined temperature level being lower than said first temperature level.

13. A device according to claim 1, wherein the heating means includes a burner and the device is adapted to couple to said burner.

14. A device according to claim 1, wherein the delay means is adapted to delay the start of the heating means by a delay time signal being 60–100% of the time signal measured by the time measuring member.

15. A device according to claim 1, wherein said processor means is adapted to generate a plurality of delay time signals, each being representative of a different length of time, and said device further includes testing means for testing two or more of said plural delay time signals to identify one delay time signal representative of a substantially optimum length of time for delaying the start of the heating means.

16. A device according to claim 15, wherein said processor means includes memory means for storing plural ratio signals, each being representative of a different percentage value, and said processor element is adapted to generate the plural delay time signals as a function of the plural ratio signals.

17. A device according to claim 15, wherein said testing means includes means for selectively turning on and off said delay means for operating said boiler with and without delays respectively.

18. Heat control apparatus, comprising heating means for heating a heat carrying medium, circulating means for circulating the heat carrying medium in a circuit, temperature detection means for detecting when the temperature of the heat carrying medium reaches a first lower temperature level and reaches a second higher temperature level, and a processor element having
a time measuring member arranged to measure a time signal representing the time between the temperature of the heat carrying medium reaching the second higher temperature level and reaching the first lower temperature level following thereupon,
means for generating a delay time signal as a function of said time signal, and
timer means, responsive to the detection of the first temperature level being reached by the medium, for measuring a period of time representative of said delay time signal and for generating, after the measured time period, a start signal to start the heating means.

19. A device for controlling a boiler having means for heating a heat carrying medium as well as means adapted to detect the temperature of the heat carrying medium and to send signals to the heating means to start and stop the heating of the medium when a first lower temperature level is reached and a second higher temperature level is reached, respectively by the medium, said device comprising delay means adapted to delay the start of the heating means when the first temperature level is reached by the medium and this first temperature level is detected by the detecting means, means for detecting the temperature of hot water drawn from a tap and heated by the heat carrying medium, and means for stopping the delay and for starting the heating means responsive to the temperature of the tapped hot-water dropping below a predetermined temperature level being lower than said first temperature level.

20. A device for controlling a burner that heats water in a water tank, comprising temperature detection means for detecting the temperature of the water and for generating a start and a stop signal representative of when the temperature of the water reaches a first lower temperature level and reaches a second higher temperature level, respectively, a time measuring member, coupled to said temperature detection means, and arranged to measure a time signal representing the time between said stop signal and said start signal, and a processor element adapted to determine a delay time as a function of said time signal and to generate as a function of the delay time, a delayed start signal for starting the burner at a time delayed from when the first temperature level is reached by the water and this first temperature level is detected by the temperature detection means.

21. A device for controlling a boiler having means for heating a heat carrying medium as well as means adapted to detect the temperature of the heat carrying medium and to send signals to the heating means to start and stop the heating of the medium when a first lower temperature level is reached and a second higher temperature level is reached, respectively by the medium, said device comprising programmable delay means adapted to generate a plurality of delay time signals, each being representative of a different length of time for delaying said signal for starting said heating means, and said device further includes testing means for testing two or more of said plural delay time signals to identify one delay time signal representative of a substantially optimum length of time for delaying the start of said heating means.

* * * * *